Figure 1:
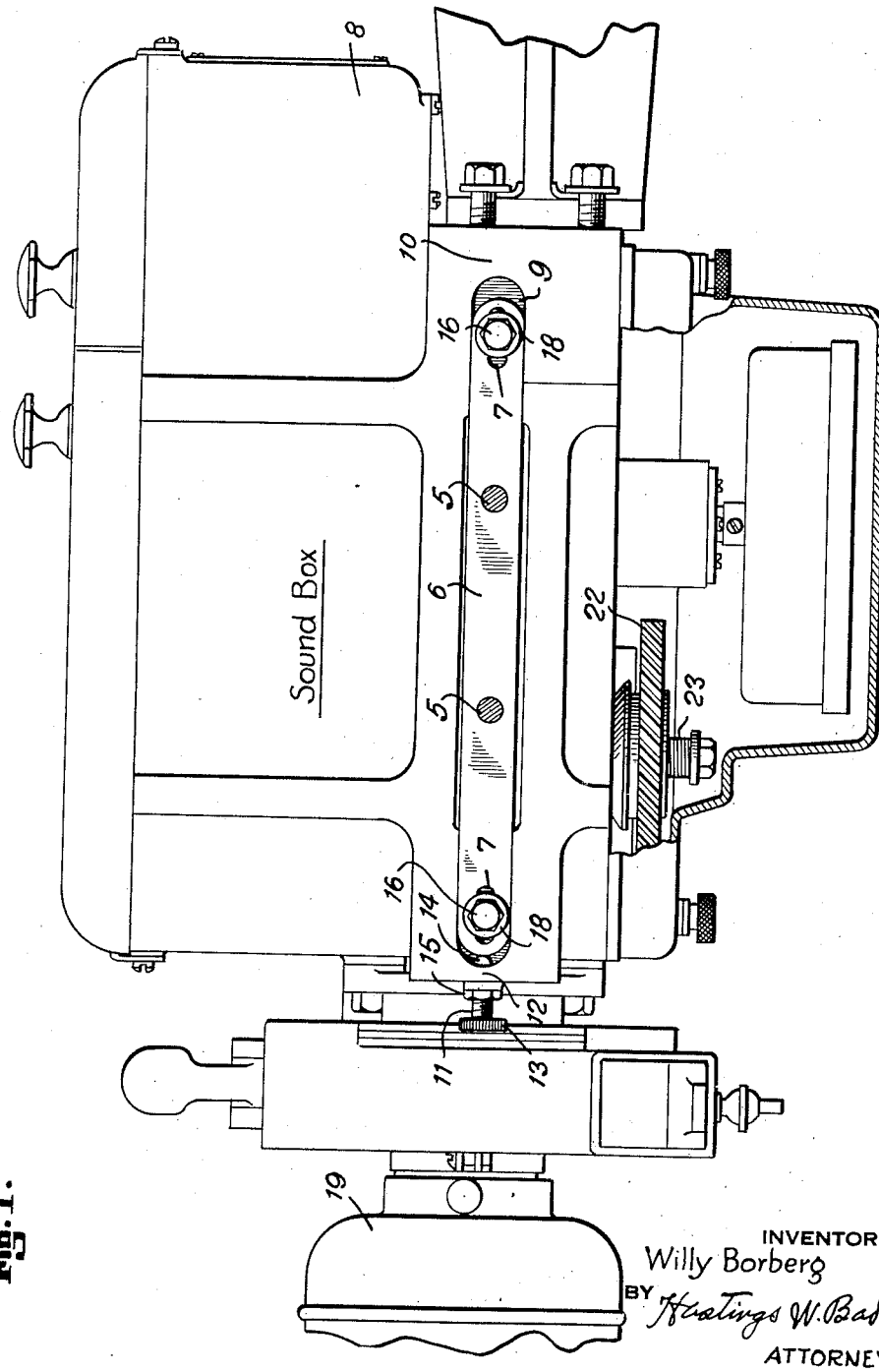

Aug. 31, 1943.	W. BORBERG	2,328,123
ADJUSTING MECHANISM FOR GEARS
Filed May 22, 1940	2 Sheets-Sheet 1

INVENTOR
Willy Borberg
BY Hastings W. Baker
ATTORNEY

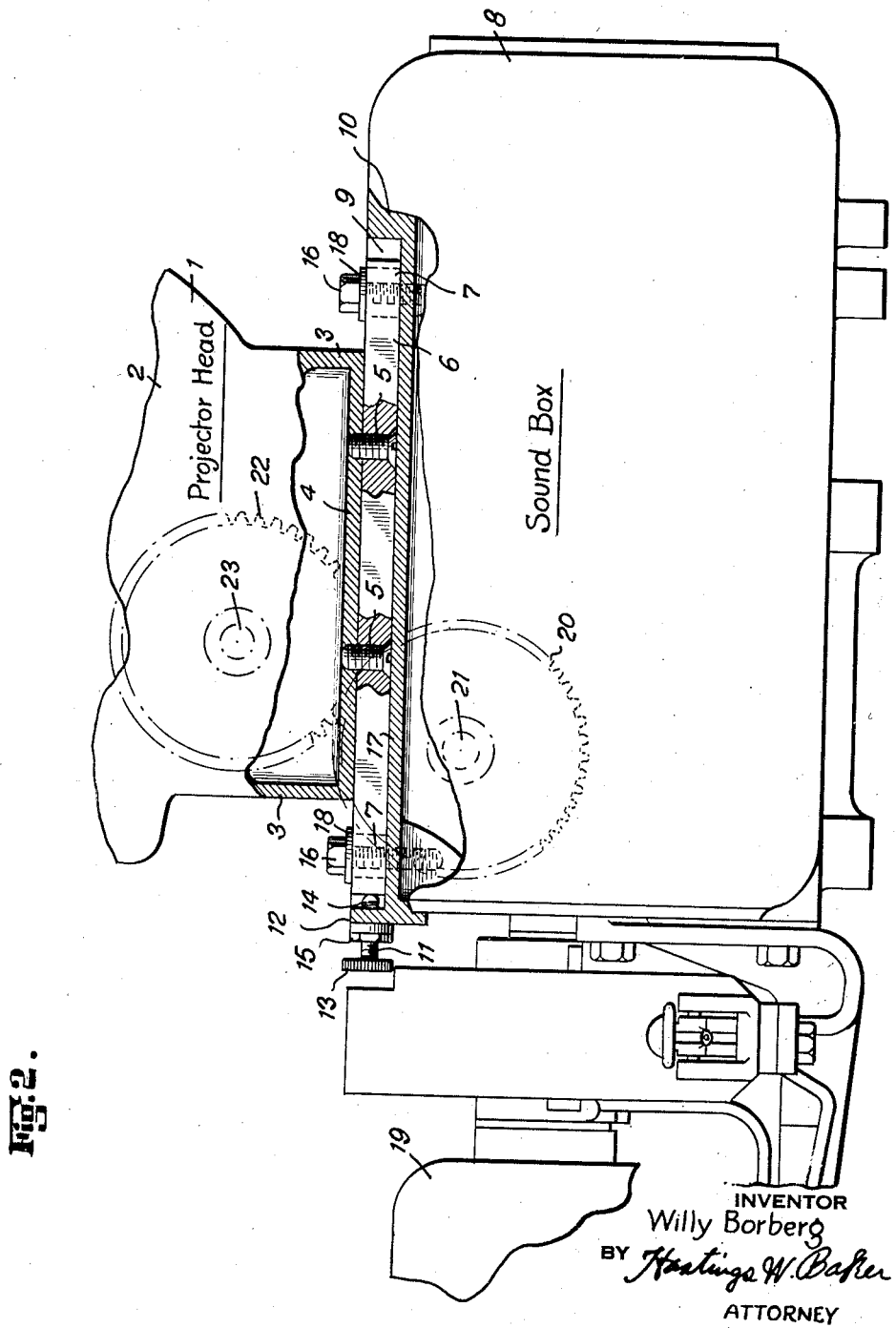

Patented Aug. 31, 1943

2,328,123

UNITED STATES PATENT OFFICE 2,328,123

ADJUSTING MECHANISM FOR GEARS

Willy Borberg, Astoria, Long Island, N. Y., assignor to International Projector Corporation, New York, N. Y., a corporation of Delaware Application May 22, 1940, Serial No. 336,606

10 Claims. (Cl. 88—16.2)

The object of this invention is to provide an adjusting mechanism for gears and in particular refers to means to move the center of one gear so that it will not mesh too tightly with another gear thereby preventing binding between the said gears.

While I have shown the invention as applied to gearing for a projector head for a sound head of motion picture equipment, the invention is applicable to many uses and is adapted to be used wherever it is desired to regulate the distances between the centers of two intermeshing gearings.

Other objects and advantages of the invention will appear in the detailed specification and claims which follow.

In the drawings in which I have shown by way of illustration the preferred embodiment of my invention, Fig. 1 is a plan view of the sound box associated with a motion picture projector, a part of the casing being broken away to show certain internal mechanism thereof and including the slide bar carried by the projector head; and Fig. 2 is a side elevational view partly in cross section of the lower portion of a projector head and the sound head on which the projector head is mounted.

Referring more in detail to the drawings, the projector head 1 consists of side walls 2, and walls 3 and a bottom wall 4. Secured to the bottom wall 4 by means of screws or bolts 5 is a bar 6, which bar is provided with slots 7 near the ends thereof.

When the projector head 1 is placed on top of the sound head 8, the bar 6 rests in a long slot 9 in the top plate 10 of the sound box. It will be noted that the long slot 9 is somewhat longer than the bar 6 so that the said bar is slidable in the slot 9. The width of the slot 9 is substantially the same as the width of the bar 6, but sufficient clearance is allowed between the sides of the bar 6 and the inside walls of the slot 9 so as to permit the bar 6 to slide in the said slot without binding. A screw 11 engages threads in the end wall 12 of the slot 9 and the screw is provided with a knurled thumb piece 13 so that by rotating the thumb piece 13 the operator may bring the end 14 of the screw 11 into engagement with the end of the bar 6 or by rotating the thumb piece in the opposite direction he can back off the end 14 from the end of the bar 6. A lock nut 15 is provided on the screw 11 so that by tightening the lock nut we can hold the screw in its adjusted position. Threaded bolts 16 pass through the slot 7 in the bar 6 and these bolts have a threaded engagement with the plate 17 of the sound head. Plates or washers 18 underlie the head of the bolts 16 and rest against the upper surface of the bar 6. The bolts are employed as a means to secure the projector head to the sound box in the adjusted position of the projector head.

A motor 19 drives, through suitable gearing, not shown a driving gear 20 mounted on a shaft 21 carried by the sound box. The gear 20 meshes with and drives a gear 22 mounted on a shaft 23 carried by the projector head. The principal object of this invention is to provide the above described means of adjusting the projector head on the sound head so that the gear 22 will correctly mesh with the gear 20 and so that these gears will not bind.

In order to make the desired adjustment, the operator would back off the screw 11 so that the end 14 would not project inwardly from the end wall 12 as much as it will project after the operator has completed the adjustment. The operator would then place the projector head on the sound head so that the bar 6 would lie in the slot 9. He would then slide the projector head to the left as viewed in Fig. 2 so that the gear 22 is brought into mesh with the gear 20, the bar 6 sliding in the slot 9. This operation would probably cause the gear 22 to mesh too tightly with the gear 20 so that there would be very little, if any, backlash. In motion picture equipment as well as when this invention is applied to many other uses, a slight amount of backlash is necessary in order to prevent undue wear of the gears and for other well known reasons. In order to prevent this binding, the operator would now rotate the thumb piece 13 so as to cause the end 14 of the screw 11 to engage the end of the bar 6 and a continued rotation of the thumb piece 13 would move the bar 6 carrying the projector head 1 to the right as viewed in Fig. 2 thereby removing the center of the shaft 23 further away from the center of the shaft 21 for relieving the binding between these gears so that the required amount of backdash would be permitted. The operator would then insert the bolts 16 and tighten them so as to hold the projector head securely in the adjusted position. Inasmuch as the projector head generally slopes downwardly so that the left hand end as viewed in Fig. 2 would be below the right hand end, there would be a tendency for the bar 6 to slide to the left as the machine runs. The bolts 16 if properly tightened would prevent such movement, but as an added precaution the lock nut 15 can be tightened so as to prevent any rotation of the screw 11 and so as to hold the end 14 of the said screw in position to positively prevent any motion of the projector head toward the left as viewed in the said Fig. 2.

While I have shown the invention as applied to a projector head for a sound head, I do not wish to limit its use to such equipment for obviously it may be used in many other places. I realize that many changes may be made in the specific form of the invention shown by way of illustration herein and I, therefore, desire to claim the same broadly except as I may limit myself in the appended claims.

Having now described my invention, I claim.

1. In combination, a sound head and a projector head, a gear carried by the sound head, a gear carried by the projector head, a slide carried by one of said heads and interposed between said heads, said slide being movable so as to bring said gears into close meshing engagement and means to move said slide so as to increase slightly the distance between the centers of said gears so as to permit of a slight amount of free play between the gears.

2. In combination, a sound head and a projector head, a gear carried by the sound head, a gear carried by the projector head, a slide carried by one of said heads and interposed between said heads, a guideway for said slide, said slide being movable so as to bring said gears into close meshing engagement, and means to move said slide so as to increase slightly the distance between the centers of said gears.

3. In combination, a sound head and a projector head, a gear carried by the sound head, a gear carried by the projector head, a slide carried by one of said heads and interposed between said heads, a guideway for said slide, said slide being movable so as to bring said gears into close meshing engagement, means to move said slide so as to increase slightly the distance between the centers of said gears and means to lock said slide against any movement after it has been adjusted.

4. In combination, a sound head and a projector head, a gear carried by the sound head, a gear carried by the projector head, a slide carried by one of said heads and interposed between said heads, a guideway for said slide, said slide being movable so as to bring said gears into close meshing engagement and manually operable means to move the slide so as to increase slightly the distance between the centers of said gears.

5. In combination, a sound head and a projector head, a gear carried by the sound head, a gear carried by the projector head, a slide carried by one of said heads and interposed between said heads, said slide being movable so as to bring said gears into close meshing engagement, a screw which when actuated is adapted to engage the slide and to move the slide so as to increase slightly the distance between the centers of said gears.

6. In combination, a sound head and a projector head, a gear carried by the sound head, a gear carried by the projector head, a slide carried by one of said heads and interposed between said heads, said slide being movable so as to bring said gears into close meshing engagement, a screw which when actuated is adapted to engage the slide and to move the slide so as to increase slightly the distance between the centers of said gears, and means to lock said screw after it has been adjusted.

7. In combination, a sound head and a projector head, a gear carried by the sound head, a gear carried by the projector head, a slide carried by one of said heads and interposed between said heads, said slide being movable so as to bring said gears into close meshing engagement, a screw which when actuated is adapted to engage the slide and to move the slide so as to increase slightly the distance between the centers of said gears, means to lock said screw after it has been adjusted, and means to lock said slide against any movement.

8. In combination, a sound head, a gear carried thereby, a projector head, a gear carried thereby, a guideway forming a part of the sound box, a bar secured to the projector head and slidable in said guideway, said projector head being insertable on the sound box so that the bar projects into the guideway, the gears being so positioned that when the projector head is moved in one direction after being inserted on the sound box, the gears will be brought into close meshing engagement, means to move the projector head and its bar so as to slightly increase the distance between the centers of said gears so as to permit of a slight amount of free play between the gears and means to lock the projector head in its adjusted position.

9. Apparatus for securing a sound head and picture projector together comprising a member adapted to fit between the projector and sound head, means for securing the projector rigidly to said member, means for maintaining the member in alignment with the sound head, means for adjusting the member longitudinally in relation to the sound head and means for rigidly securing the member to the sound head.

10. Apparatus for securing a sound head and picture projector together comprising a plate adapted to fit between the projector and sound head, means for securing the projector rigidly to said plate, cooperating means on the plate and sound head for maintaining the plate in alignment with the sound head, means for adjusting the plate longitudinally in relation to the sound head and means for rigidly securing the plate to the sound head.

WILLY BORBERG